United States Patent [19]
Furahashi

[11] 3,829,662
[45] Aug. 13, 1974

[54] RECORDING MEDIUM HAVING CONCEALED INFORMATION AS INPUT FOR ELECTRONIC COMPUTER

[75] Inventor: Akira Furahashi, Tokyo, Japan

[73] Assignee: Canon Kabushiki Kaisha, Tokyo, Japan

[22] Filed: Oct. 12, 1972

[21] Appl. No.: 296,965

Related U.S. Application Data

[63] Continuation of Ser. No. 27,353, April 10, 1970, abandoned.

[30] Foreign Application Priority Data

Apr. 17, 1969 Japan ........................... 44-29807
Apr. 17, 1969 Japan ........................... 44-29808
Apr. 17, 1969 Japan ........................... 44-39809
Apr. 17, 1969 Japan ........................... 44-35223

[52] U.S. Cl....235/61.12 R, 235/61.11 E, 250/219 D, 340/149 A, 88/24, 235/61.7 B

[51] Int. Cl... G06k 7/12, G06k 19/06, G01n 21/30, H04q 3/72

[58] Field of Search ............ 235/61.11 E, 61.11 D, 61.11 R, 235/61.6 R, 61.7 B, 61.12 N, 61.12 M, 61.12 R; 283/7; 340/149 A; 40/130; 88/24; 250/219 DC

[56] References Cited

UNITED STATES PATENTS

| | | | |
|---|---|---|---|
| 2,547,838 | 4/1951 | Russell | 235/61.12 M |
| 3,038,271 | 6/1962 | MacHutchin | 40/130 |
| 3,052,405 | 9/1962 | Woodland | 235/61.11 E |
| 3,085,469 | 4/1963 | Carlson | 88/24 |
| 3,239,815 | 3/1966 | Martens | 340/149 Z |
| 3,279,826 | 10/1966 | Rudershausen | 283/7 |
| 3,502,851 | 3/1970 | Kakimoto | 235/61.12 N |
| 3,536,894 | 10/1970 | Travioli | 235/61.6 R |

*Primary Examiner*—Daryl W. Cook
*Assistant Examiner*—Robert M. Kilgore
*Attorney, Agent, or Firm*—Fitzpatrick, Cella, Harper & Scinto

[57] ABSTRACT

Recording medium uses a base on which a signal or data is recorded. On the base a coating is applied, which is of a material not transmitting the visible rays. For rendering the data marked or punched unintelligible to the human eyes, applying over the punched or marked data a substance which cannot transmit therethrough the visible rays.

9 Claims, 18 Drawing Figures

RECORDING MEDIUM HAVING CONCEALED INFORMATION AS INPUT FOR ELECTRONIC COMPUTER

This is a continuation of application Ser. No. 27,353, filed Apr. 10, 1970, for "Recording Medium Having Concealed Information As Input for Electronic Computer", now abandoned.

The present invention relates to a recording medium having the concealed information as input for an electronic computer, a method for preparation of the same and a method for feeding said concealed information into an electronic computer.

As data input means for electronic computers are widely used the punched-card or tape systems and magnetic-tape systems. The information such as alphanumerics, patterns, etc., are photoelectrically or magnetically read. As electronic computers are used in various fields more and more, a number of operators is increased. Furthermore, the input-output symbols or codes are standardized throughout the world and more simplified input-output symbols or codes are used. Therefore, punched cards or tapes serving as input-output data recording medium are well known even among the laymen, who can interpret the data with ease. Input data recording mediums are generally stored for a predetermined time and retrieved by many people.

However, sometimes the recording mediums such as cards or tapes contain the information which must be kept confidential so that when the information or data recording mediums are accessible to anyone, the confidential information tends to leak out. Thus, it is very important to keep the information recorded upon the recording mediums confidential.

The primary object of the present invention is therefore to keep the information recorded or punched upon recording mediums confidential.

Another object of the present invention is to provide a recording medium which can conceal the information recorded thereupon.

A further object of the present invention is to provide a recording medium of the character described above whose concealed information can be read in a simple manner so as to be fed into an electronic computer.

A further object of the present invention is to provide a recording medium of the character described hereinabove which is suited as input means for an electronic computer.

A further object of the present invention is to provide a method for preparation of the recording medium of the character described above.

The above and other objects, features and advantages of the present invention will become more apparent from the following description of the preferred illustrative embodiments thereof taken in conjunction with the accompanying drawing in which.

As mentioned before, data to be processed by the electronic computers are generally printed or written manually upon cards made of paper and the like or punched in the cards. The punched or marked cards are read by a reader so that the electrical signals are applied to the computers. The present invention contemplates to render the data marked or punched unintelligible to the human sensing organs, especially by the eyes, by applying over the punched or marked data a substance which cannot transmit therethrough the visible rays.

Figure 1:
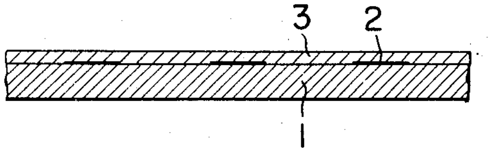
FIGS. 1 and 2 are sectional views of recording mediums which can conceal the information recorded thereupon in accordance with the present invention.

Referring to FIG. 1, upon a base 1 is recorded a signal or data 2 which is applied a coating 3 of a material which will not transmit the visible rays. This material will be referred to as "visible light shielding material or member" hereinafter for brevity.

Figure 2:
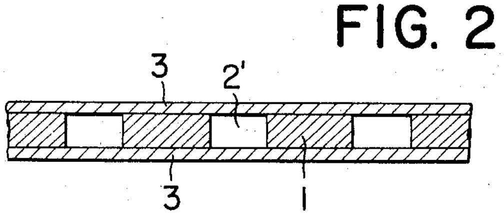

When the base 1 is punched as in the case of the punched cards, the coating 3 of the visible light ray shielding material are applied to both of the sides as shown in FIG. 2, thereby concealing the punched holes 2'. In both of the marked and punched cards, the marked and punched data can be completely concealed so that they are unintelligible to the naked eyes.

When the concealed data are read out, the radiation rays which can transmit through the visible light shielding coating 3 are used together with the photoelectric elements for detecting these radiation rays. The radiation rays must be invisible rays and transmit through the visible light shielding coating 3.

However, when these radiation rays transmit through the marked or unpunched portions of the base 1 in the same manner as they do through the unmarked or punched portions, the data upon the card or base 1 cannot be detected at all. Therefore, the radiation rays used for detection, the data recording systems such as printing, punching, etc., the materials of the base 1 must be suitably selected.

More specifically, to the base is applied the coating of the visible light ray shielding material for concealing the recorded signal or data and the invisible radiation rays are projected upon the signal or data recording medium so that the invisible radiation rays which transmit through the recording medium may be detected except the invisible radiation rays which are shielded by, for example, signal or data bearing portions of the recording medium. The detected invisible radiation rays may be converted into the electrical signals to be fed into the electronic computers.

When the base 1 is to be punched as shown in FIG. 2, the surface of the base 1 is previously applied with a coating of a material which cannot transmit the invisible radiation rays or the base 1 itself may be made of a material which cannot transmit the invisible radiation rays.

After the card or base 1 is punched, to both sides thereof are applied the coatings of a material which can transmit the invisible radiation rays but cannot transmit the visible rays, thereby concealing the punched holes 2'. Thus prepared recording medium may be detected by photoelectric element to be converted into electrical signals for using as an input to computers.

The material to be used for the base or recording medium is such as, for example, card or tape made of paper and the like or resin or metallic plate, etc.

The material, which cannot transmit the visible rays, is for example, polyvinyl buthyral resin (Sekisui Chemical K. K. Trade name S-lec BLS) or said resin blended with another resin in weight ratio less than 50 percent of molecular weight less than 10,000, both resins being mutually soluble, to which is added as a dye Orazal BL (Trade name made by CIBA Co.) for making the material to become invisible. Thus obtained material is adhered on the base or recording medium by a suitable method, for example, heat-melt or adherance so as to obtain the coating of concealing information. This can be applicable for detecting the concealed information by a magnetic head described later.

In the present invention, the invisible radiation rays imply the radiation rays outside of the spectrun range of visible rays. They are, for example, infrared rays, ultraviolet rays, etc. Data such as alphanumerics, symbols, etc., may be marked by use of, for example, carbon black ink which cannot transmit the invisible radiation rays.

Next, one embodiment of a concealed data detecting device or reader in accordance with the present invention will be described, but it must be understood that any other suitable means may be used in order to detect or read the data concealed or made intelligible in accordance with the present invention.

Figure 3:
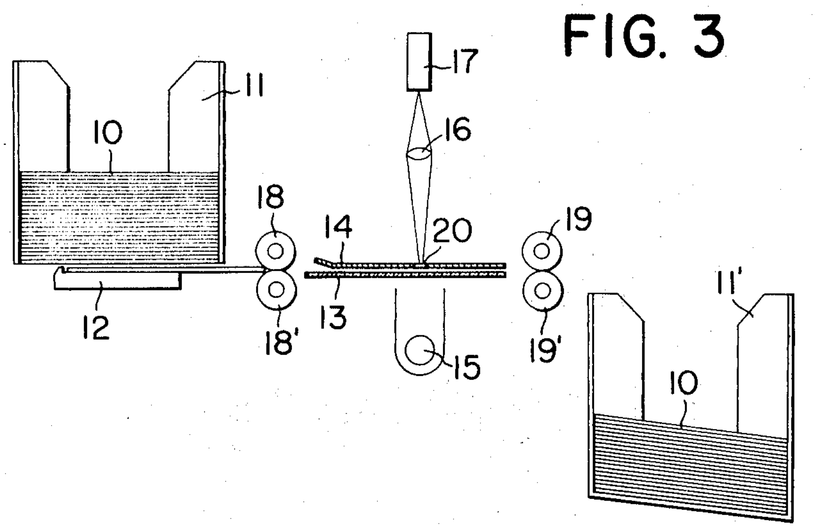
FIGS. 3 to 5 are for explanation of a method and device for detecting or reading the concealed information.

Referring to FIG. 3, in a card reservoir 11 are stacked with cards 10 whose data are concealed as described hereinabove in accordance with the present invention. The cards 10 are fed one by one into a reading section by feeding means 12 and a pair of card feed rollers 18 and 18'. The reading section includes a guide plate 13, a pressure plate 14, an invisible radiation ray, e.g., infrared, ultraviolet ray, etc., source 15, a condenser lens 16, a phototransistor 17 and a pair of discharge rollers 19 and 19'.

Figure 4:
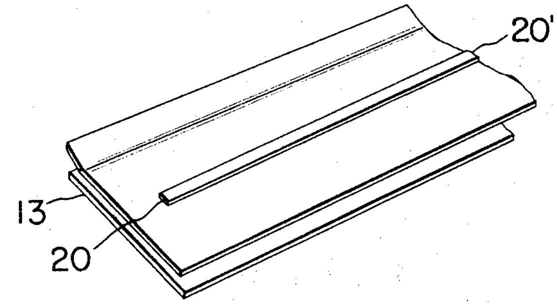

The guide plate 13 is made of a material which can transmit the invisible radiation rays and the pressure plate 14 is disposed in upwardly spaced apart relation with the guide plate 13. As shown in FIG. 4, the pressure plate 14 is provided with a slit 20 formed therethrough at a right angle relative to the card feed direction. The width of the slit 20 is substantially equal to that of the card 10.

The condenser lens 16 and the phototransistor 17 are arranged upwardly of the slit 20 while the invisible radiation ray source 15 is disposed below the guide plate 13. The card 10 is fed between the guide plate 13 and the pressure plate 14 by the feeding means 12 and the feed rollers 18 and 18'. When the card 10 passes below the slit 20, the invisible radiation rays from the source 15 transmit through the guide plate 13 and impinge upon the card 10. Since the card 10 has portions which cannot transmit the invisible radiation rays as described hereinabove, only the invisible radiation rays transmitted through the transmissive area of the 10 are condensed or focused by the condenser lens 16 on the phototransistor 17. By the phototransistor 17, the focused invisible radiation rays are converted into the electrical signals which are inputs to an electronic computer. The data upon the card 10 are read sequentially in a manner as described above and returned into a card receiver 11' through the discharge rollers 19 and 19'.

Thus, it is seen that the cards bearing the concealed data can be continuously fed into the electronic computer. The invisible radiation rays transmit through the card depending upon the pattern of the data recorded thereupon, but their intensity is reduced because they must transmit through the visible ray shielding coating and the base of the card. It is therefore seen that it is more preferable to amplify the transmitted invisible radiation rays before they are detected by the photoelectric element such as phototransducer. Therefore, the present invention contemplates the use of quenching effect of the fluorescent material by the infrared rays in order to improve the reading with a higher degree of accuracy. More specifically the infrared rays are projected upon the card having the concealed data in accordance with the present invention and an information pattern by the infrared rays transmitted through the recording medium are projected upon a fluorescence screen which is illuminated by the projection of the ultraviolet rays, thereby forming a fluorescence pattern representative of the data or information pattern of the recording medium. This fluorescence pattern is detected by photoelectric elements so as to convert it into the electrical signals to be fed into the computer.

The fluorescence at a spot upon which are impinged the infrared rays is quenched while the fluorescence at a spot upon which are impinged no infrared rays remains unchanged or fluorescent. That is, a fluorescence pattern is obtained upon the screen in response to the information pattern. The luminescence of this fluorescence pattern is detected by photoelectric elements and converted into electrical signals to be fed into the electronic computer.

The infrared pattern passing through the recording medium can be converted into a fluorescence pattern having distinct dark and light areas so that the reading by the photoelectric elements can be accomplished with a higher degree of accuracy.

Figure 5:
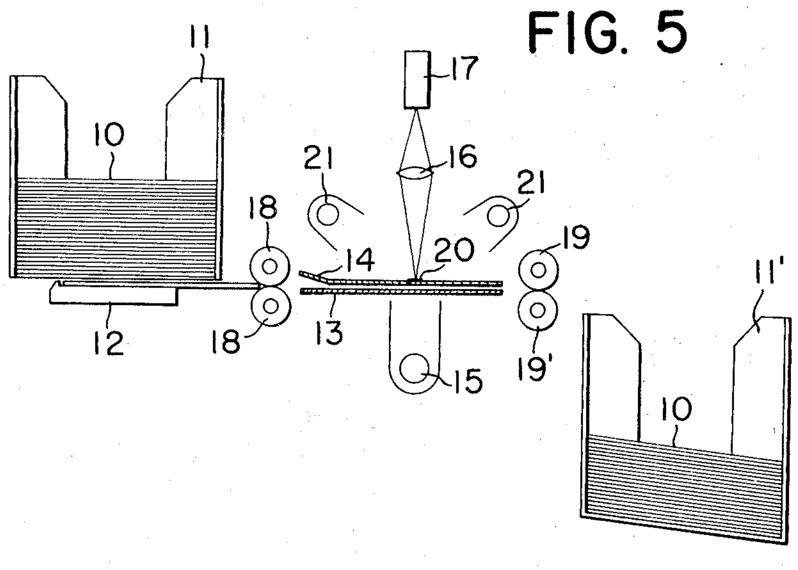

When the concealed recording medium as shown in FIG. 1 is used, the infrared rays will not transmit through the spot marked with the ink which cannot transmit the invisible radiation rays so that the spot on the fluorescent screen corresponding to the marked spot of the recording medium is illuminated. When the concealed recording medium as shown in FIG. 2 is used, the punched holes 2' transmit the infrared rays so that spots corresponding to the punched holes upon the fluorescent screen are not illuminated. A reader based upon the principle of the present invention described hereinabove will be described with reference to FIG. 5. The reader illustrated in FIG. 5 is substantially similar to that shown in FIG. 3 except that the infrared ray source 15 is used; a fluorescent screen or film 20' is applied to the slip 20 of the pressure plate 14; and the ultraviolet ray source 21 is arranged upwardly of the pressure plate 14 so as to project the ultraviolet ray upon the fluorescent film 20'.

Photoluminescence is to be excited at the fluorescent film 20' by the ultraviolet rays from the source 21, but since the infrared rays from the source 15 impinge upon the fluorescent film 20' through the guide plate 13, photoluminescence is not excited. When the card 10 passes below the fluorescent film 20′ between the guide plate 13 and the pressure plate 14, by the feeding means 12, rollers 18, 18′, the infrared rays impinge upon the undersurface of the card 10. Since the card 10 has the construction described hereinabove, the infrared rays passed through the infrared ray transmission spots are impinged upon the fluorescent film 20′ so that the impinged spots are prevented from being illuminated.

On the other hand, the infrared rays impinged upon the infrared ray shielding spots of the recording medium or card 10 is prevented from the transmission through the card 10 so that the spots on the fluorescent film 20′ corresponding to these infrared ray shielding spots of the card 10 are illuminated. Thus, the data or information pattern recorded upon the card 10 is obtained as a fluorescent pattern upon the film 20′. The fluorescent pattern may be converted into the electrical signals by the condenser lens 16 and the phototransistor 17 in a similar manner as described with reference to FIG. 3 and is fed into the electronic computer. The read-out cards 10 are discharged into the card receiver 11′ through the discharge rollers 19 and 19′. Thus, the data or information upon the cards 10 may be continously fed into the computer.

According to a further embodiment of the present invention, the invisible light is projected upon the recording medium and the data or information thereupon is detected or read by detecting the light reflected upon the recording medium. That is, as a base of recording medium is used a white or light-colored paper such as art paper having a smooth and luster surface. Alternatively, a synthetic resin or metallic sheet having its one surface so treated as to have a silver surface for reflecting the invisible light may be used.

Figure 6:
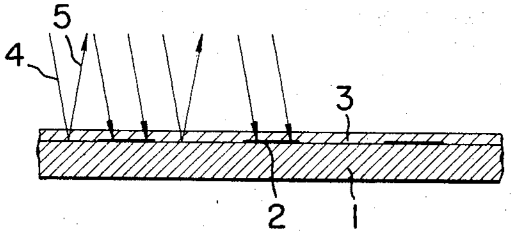
FIGS. 6 to 9 are for explanation of another detecting or reading method and device in accordance with the present invention.
Figure 7:
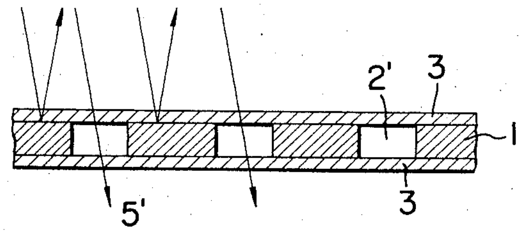

As shown in FIG. 6, the information such as characters, patterns, symbols, etc., are marked upon the recording medium of the type described hereinabove with an invisible light absorbing ink or punched at 2′ as shown in FIG. 7. Next the recording medium is coated with a visible light shielding material which can transmit the invisible light, thereby concealing or rendering the information upon the recording medium unintelligible.

When the information recorded upon the medium is seen from the back thereof or when the information is recorded as punched holes, both sides of the recording medium may be applied with the coatings of the character described above. When the invisible light absorbing ink is used, the information may be recorded on both sides of the recording medium and thereafter the coatings of the character described above are applied to the both sides so as to conceal the information. When the invisible light 4 is projected upon the recording mediums shown in FIGS. 6 and 7, the invisible light 4 transmits through the information concealing coating 3 and impinges upon the surface of the recording medium 1.

The invisible light impinged upon a reflecting spot upon the recording medium 1 is reflected and transmitted through the coating 3 as shown by 5. Or the invisible light 4 passes through the holes 2′ of the recording medium 1 shown in FIG. 7. Thus, it is seen that the information pattern is obtained in the form of a reflected light pattern, which may be converted into the electrical signals and fed into the electronic computer in a similar manner as described hereinabove.

Figures 8, 9:
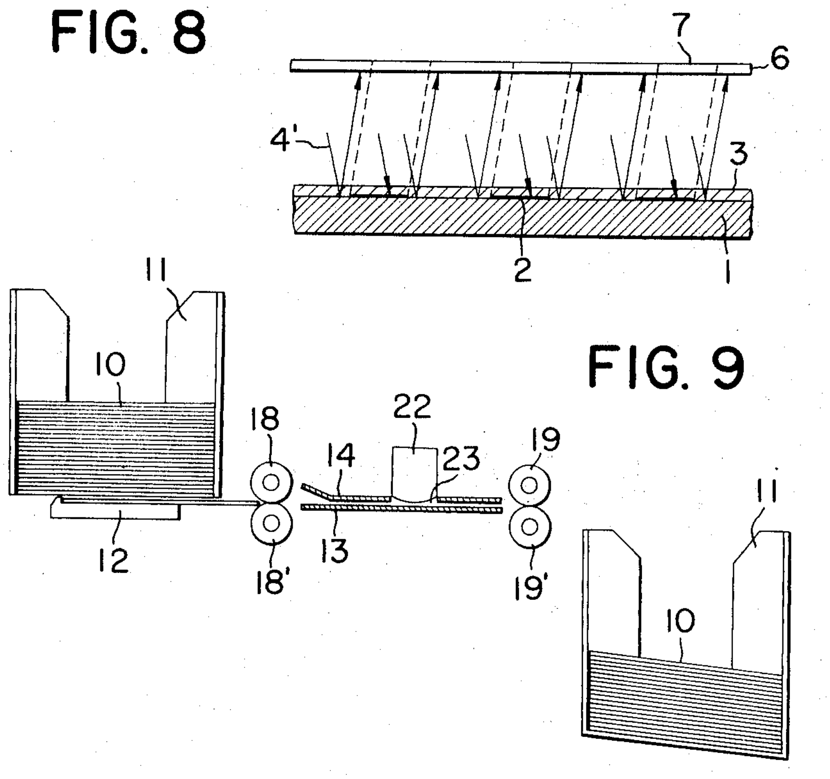

As shown in FIG. 8 when the infrared rays 4′ are used as invisible light, the reflected infrared rays may be impinged upon the fluorescent screen 6 which has been excited by the ultraviolet rays, thereby obtaining a fluorescent pattern 7 of the information pattern upon the screen 6 by the quenching of the infrared rays. The fluorescent pattern 7 may be converted into electrical signals and fed into the computer in a similar manner as described with reference to FIG. 5. Since the reflected infrared rays are amplified by detecting it with the aid of the photoelectric element through a suitable optical system, the reading with a higher degree of accuracy may be enhanced.

In some case, the information is recorded magnetically by use of, for example, a magnetic ink and is read by a magnetic head. In this case, the magnetically recorded information may be concealed or rendered unintelligible by applying thereupon a coating or a material which can transmit the magnetic flux. That is, magnetic pattern representative of the information pattern recorded upon the recording medium is obtained through the information concealing coating. The magnetic pattern may be converted into electrical signals by a magnetic head and fed into the computer. A reader in accordance with the present invention for reading this magnetic pattern will be described with reference to FIG. 9. A card 10 having the information magnetically recorded and the information concealing coating of the character described above is received in the card reservoir 11 with its recording side facing upwardly and is fed into the reading section one by one by feeding means 12 and the feed rollers 18 and 18′. The reading section includes the guide plate 13, the pressure plate 14, a magnetic head 22, the feed rollers 18 and 18′ and the discharge rollers 19 and 19′. The card 10 is fed between the guide plate 13 and the pressure plate 14 by the feed rollers 18 and 18′. The pressure plate 14 is provided with a slit 23 into which is fitted the magnetic head 22. When the card 10 passes through the slit 23 of the pressure plate 14, the magnetic head 22 detects the magnetic flux from the magnetically recorded information pattern upon the card 10 so as to convert it into electrical signals which in turn are fed into the computer as inputs. The card 10 is discharged into the card receiver 11′ through the discharge rollers 19 and 19′. Thus, the information upon the cards is continuously fed into the computer.

Figure 13:
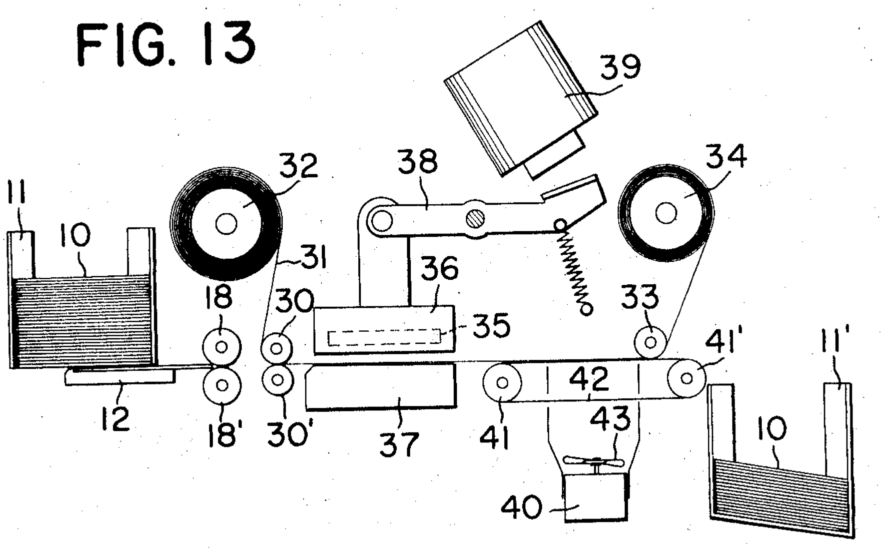
FIG. 13 is for explanation of one embodiment of the continuous recording medium preparation of recording mediums of the type shown in FIG. 1.

Next, one embodiment of a device for continuously preparing the recording mediums whose information is concealed in accordance with the present invention will be described hereinafter. First referring to FIG. 13, 10 designates an information recording card made of an invisible light transmission material has the information marked thereupon with, for example, an invisible light shielding ink. These cards 10 are stacked in the card reservoir 11 with their information bearing sides faced upwardly. The cards 10 in the card reservoir 11 are fed one by one between a pair of card feed rollers 18 and 18′ by feeding means 12 and then between a pair of guide rollers 30 and 30′ so as to be placed under the undersurface of an information concealing coating belt 31 supplied from a supply roller 32 and wrapped around the guide rollers 30 and 33 and wound around a winding roller 34. Therefore, the cards 10 are transported toward a heating and pressure application section.

Figure 10:
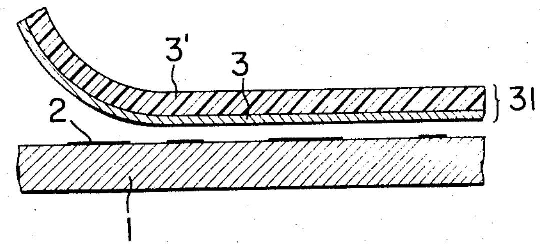
FIGS. 10 to 12 are for explanation of the preparation of the recording medium shown in FIG. 1.

As shown in FIG. 10, the belt 31 comprises a base belt 3' made of, for example, polyester film, polypropylene film, etc., and an information concealing coating 3 made of a material which can transmit invisible light but cannot transmit the visible light. The coating 3 is so formed upon the base belt 3' that the coating 3 may be easily separated therefrom when heat and pressure are applied. It is of course seen that the coating 3 is in opposed relation with the information bearing surface of the card between the guide rollers 30 and 33.

Figure 11:
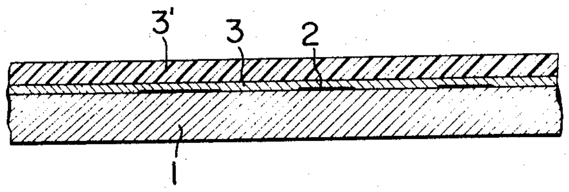

Upon the information bearing surface of the card 10 is transferred the coating 3 when the card 10 is placed upon a backing member 37 and pressed by a movable pressure plate 36 incorporating therein heating means 35 so that the transferred coating 3 is attached upon the card 10 as shown in FIG. 11.

Figure 12:
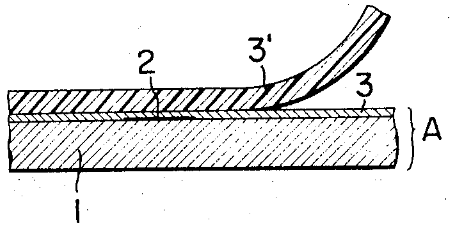

The movable pressure plate 36 is arranged for vertical movement by suitable linkage 38, a magnet 39, etc., so that pressure plate 36 may be lowered and pressed against the card 10 when it is transported toward and held in position upon the backing member 37. Since the separation of the card 10 from the base belt 3' is difficult when the fused coating 3 is still hot, the card 10 is transferred toward a cooling section 40, which comprises a card transportation device including a pair of spaced apart rollers 41 and 41' and an endless belt 42 wrapped therearound and a cooling fan 43 for cooling the card 10 and the coating 3 fused thereupon. Then, the coating 3 may be easily separated from the belt 3' at the guide roller 33 as shown in FIG. 12. The cards 10 applied with the information concealing coating 3' are discharged into the card receiver 11' by a conveyor belt 42.

Figure 18:
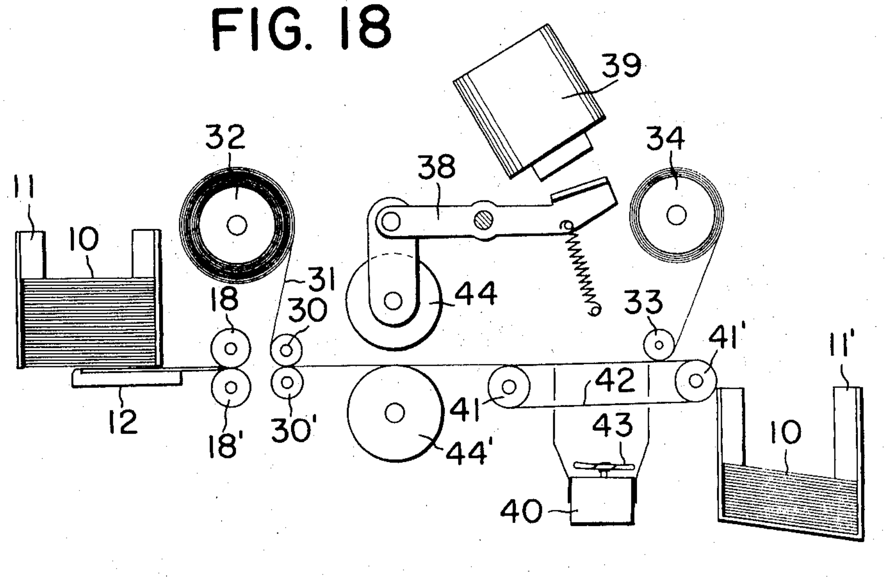

The cards 10 in the receiver 11' may be directly fed into the readers of the type described hereinabove or stored after sorted by a suitable sorter as information retrieval cards. In the instant embodiment, the heat and pressure application section has been described as comprising the pressure plate 36 and the backing member 37 so that the cards 10 must be intermittently transported. But when they are designed in the form of a heating roller 44 and a backing roller 44' as shown in FIG. 18, the cards 10 may be continuously fed, thereby providing a hot stamping type information concealing device.

Figure 14:
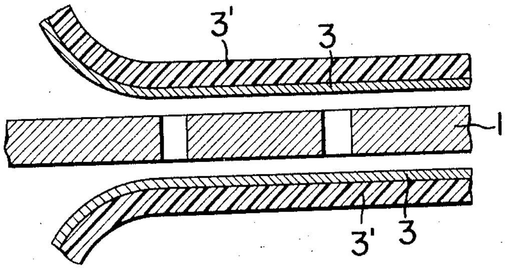
FIGS. 14 to 16 are for explanation of the steps of applying the information concealing coatings on both sides of a recording medium as shown in FIG. 2.
Figure 15:
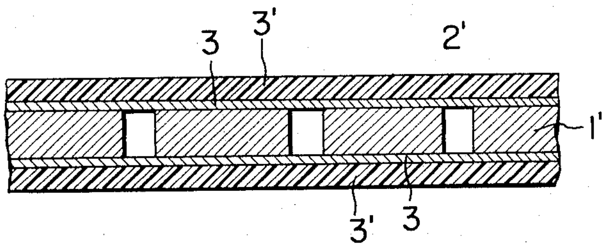
Figure 16:
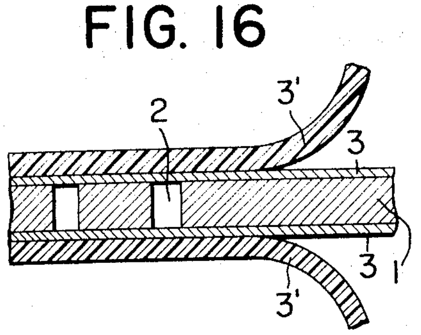
Figure 17:
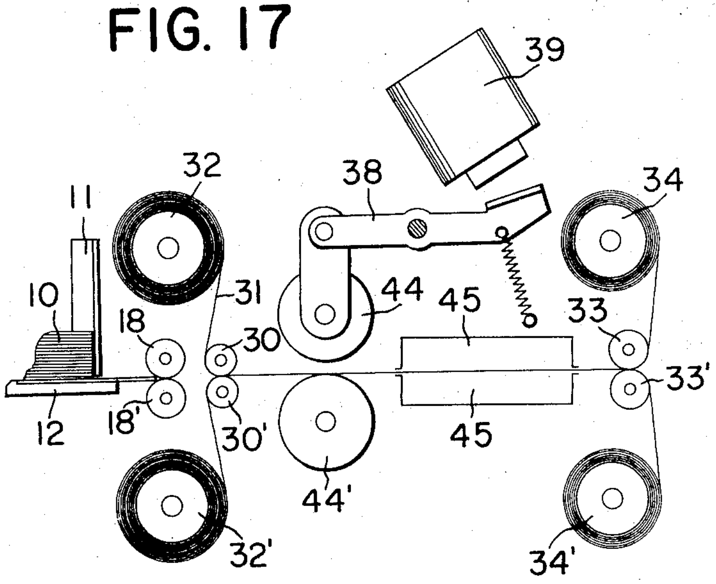
FIGS. 17 and 18 are schematic diagrams illustrating two embodiments of the devices for applying the information concealing coatings on both sides of the recording medium as shown in FIGS. 14 to 16.

When the cards are punched or when the information recorded upon one surface of the recording medium is seen from the other surface thereof, both surfaces must be applied with the information concealing coatings. An embodiment of an information concealing device especially suited for this purpose is shown in FIG. 17 where two information concealing coating carrying belts 31 are arranged so that the cards 10 are fed between the two belts 31 as shown in FIG. 14 and applied with heat and pressure as shown in FIG. 15, whereby the information concealing coatings 3 may be applied to both sides of the recording medium as shown in FIG. 16.

The information in the form of characters, numerals, patterns, symbols, etc., is recorded by printing or manual writing with the use of an ink which cannot transmit invisible light.

Alternatively the cards and the like may be punched so as to record the information. Thereafter, the recording medium bearing the information is applied with a coating which cannot transmit visible light, thereby concealing the recorded information. Thus concealed information can be read by the readers of the type described hereinabove.

Therefore, the information can be controlled with ease and fed into the computer in an improved manner. The present invention can be applied to a wide variety of fields.

What is claimed is:

1. A recording element bearing concealed information for use as an input for an electronic computer, said element comprising a recording medium with a first material which reflects invisible light, said first material being arranged on said medium in accordance with information, and a coating of a second material which transmits invisible light but which cannot transmit visible light, said coating covering said recording medium to conceal said information.

2. A recording element bearing concealed information for use as an input for electronic computers, said element comprising a recording medium including a first material which reflects invisible light, said medium including said first material being formed with punched holes and in accordance with said information, a coating of a second material which transmits invisible light but cannot transmit visible light, said coating covering said recording medium including said first material thereby concealing the recorded information.

3. A recording element as claimed in claim 2 wherein said information concealing coating is applied to both sides of said recording medium.

4. A recording element bearing concealed information for use as an input for electronic computers, said element comprising a recording medium having invisible light transmission material and invisible light shielding material arranged in different areas corresponding to said information, a coating of a material which transmits invisible light but cannot transmit visible light, said coating being applied to the surface of said recording medium thereby concealing said information and a fluorescent layer provided for exciting photoluminescence by said invisible light.

5. A method for feeding input information into an electronic computer said method comprising the steps of recording the information upon a recording medium with an invisible light reflecting material, applying to said recording medium a coating of a material which can transmit invisible light but cannot transmit visible light, projecting invisible light upon said recording medium, detecting the reflected invisible light and converting said detected invisible light into electrical signals to be fed as input into the electronic computer.

6. A method for feeding input information into an electronic computer said method comprising the steps of making a recording element from an invisible light reflecting material by applying to said element a recording medium of a material reflective to invisible light, recording the information in the form of punched holes through said recording medium, applying to said recording medium a coating of a material which transmits invisible light but cannot transmit visible light, projecting invisible light upon said recording medium, detecting the reflected invisible light and converting the detected light into electrical signals.

7. A method for feeding input information into an electronic computer said method comprising the steps of recording the information in a recording medium in combinations of invisible light transmission areas and invisible light shielding areas, applying to said recording medium a coating of a material which transmits invisible light but cannot transmit visible light, thereby concealing said information, providing a fluorescent layer adapted to be excited by invisible light, exciting said fluorescent layer by ultraviolet rays, projecting upon the surface of the recording medium having no fluorescent layer invisible light which transmits through said recording medium and quenches said excited fluorescent layer at the spots corresponding to said invisible light transmission portions of said recording medium, detecting a fluorescent pattern formed by the spots excited and illuminated by the ultraviolet rays but not quenched by said invisible light, and converting said fluorescent pattern into electrical signals to be fed as input into the electronic computer.

8. A device for preparation of a recording medium having concealed information as input for an electronic computer comprising a feed mechanism for feeding a recording card upon which is recorded the information by a combination of invisible light transmission areas and invisible light shielding areas, a mechanism for attaching by heat and pressure upon at least one side of said card an information concealing coating which is carried upon a base, and a mechanism for cooling said concealing coating attached to said card and separating said coating from its base.

9. A recording element bearing concealed information for use as an input for electronic computers, said element comprising a recording medium having a first material which reflects infrared rays and a second infrared ray absorbing material arranged in different areas corresponding to said information, a coating of a material which transmits infrared rays but cannot transmit visible light, said coating being applied to the surface of said recording medium thereby concealing said information, and a fluorescent screen which is preexcited by ultraviolet rays, said fluorescent screen being disposed in spaced relationship with respect to said recording medium so that reflected infrared rays impinge thereon to form a fluorescent pattern of information by the quenching of the infrared rays.

* * * * *